United States Patent Office 3,164,469

Patented Jan. 5, 1965

3,164,469

ONE-COMPONENT DIAZO PROCESS

Hans Behmenburg, Wiesbaden-Biebrich, and Martin Glos, Wiesbaden, Germany, assignors, by mesne assignments, to Keuffel & Esser Company, Hoboken, N.J.

No Drawing. Filed Mar. 3, 1961, Ser. No. 93,048
Claims priority, application Germany, Mar. 4, 1960, K 40,080
5 Claims. (Cl. 96—49)

The present invention relates to making copies by the diazo process and more particularly by a one-component diazo process.

Heretofore various means and processes of making diazo type reproductions have been used, but none have been entirely satisfactory to provide a simple process with a simple apparatus which could be used by relatively inexperienced personnel with a minimum of danger to the personnel and a minimum of objectionable odors.

At present, there are used two different kinds of light sensitive diazo compounds for photoprinting purposes. One of these comprises compounds which are decomposed by the action of light so that, after exposure under a master, they are no longer capable of coupling in the exposed areas, while in the unexposed areas they are coupled by means of azo components to form images in azo dyes, preferably of a very dark shade.

The second kind of diazo compounds, which includes in particular the so-called diazo hydroxides, undergoes such an intense change in its solubility characteristics when exposed to light, after exposure under a master, a layer made up of such diazo compounds may be selectively washed away, either in the exposed or in the unexposed areas, depending on the kind of solvent used. Therefore, these compounds are used mainly for the preparation of planographic printing plates.

Now it has been found that one group of compounds of the first-mentioned kind are not only unstable to light, i.e. are capable of bleaching out, but, in addition thereto, possess the valuable quality of forming dark-colored decomposition products which for practical purposes are stable to light, when they are heated to about 100° C.

This surprising combination of properties can be utilized for practical purposes in a novel photo printing process, which can be carried through without the additional application of gaseous, solid or liquid substances for the formation of an image after exposure under a master, i.e. leads to the formation of a so-called "Integral light image" according to Kögel. Moreover, this process represents a thermographic process which yields heat-resistant images, an ideal condition so far unattained by any of the known thermographic processes, because these, in a way, yield only "unfixed" images, which are unstable to unintentional and unavoidable heat influences, such as heating, strong sun rays, cigarette burns and the like, and become illegible if exposed to such influences. For this reason, the heat copies hitherto known have been unsuitable for documentation purposes.

To make use of the qualities mentioned above, the light sensitive material according to the present invention is processed as follows: An image of the master used is produced on a layer consisting of the diazo compound in question and supported by one of the customary supporting materials, e.g. paper, film, metal plates, one of the light sources customarily used in photo printing techniques being used. By this exposure, the exposed areas of the layer bleach out. The "light copy" thus produced is then heated to 100–130° C., e.g. by introducing it into a gap formed by two heated rollers. This can be done in one of the commercially available machines. By this process, the diazo compound hitherto undecomposed by light influence undergoes also a decomposition process, which, however, is fundamentally different from the light decomposition process. While the decomposition due to the influence of light causes bleaching out of the compounds, heating causes dark-colored, bluish black to brown-black dyestuffs to be formed, which for practical purposes are stable to light. So far, the chemical constitution of these decomposition products is unknown. Thus, the finished copy contains no substances which are sensitive either to heat or light. As a substitute, the heat treatment may be carried through in a drying oven such as those used in laboratories, provided it can be heated to more than 100° C.

An object of the present invention is to provide a process and a material for making copies without requiring the use of additional chemicals and without requiring the use of expensive apparatus or skilled personnel.

Another object is to provide a material which can be exposed to actinic light and then developed to a visible image solely by the application of heat.

It has now been found that good reproductions can be obtained by the photoprinting process if light sensitive one-component diazotype material is used containing diazonium salts from p-phenylene diamines corresponding to the general formula

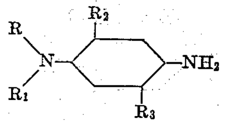

or the general formula

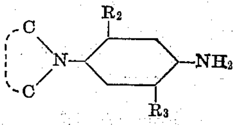

in which R stands for alkyl, aralkyl, aryl, or acyl, $R_1$ stands for H, alkyl, aralkyl, or aryl, $R_2$ and $R_3$ for hydrogen, halogen, alkyl or alkoxy, and

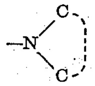

for the group of a heterocyclic ring, possibly a heterocyclic ring containing further heteroatoms in the ring.

The light sensitive coating of the one-component diazotype material to be used as provided by the invention may contain in addition to the diazo compound or compounds additives commonly used in diazotype practice to increase the stability of the coatings or to improve the color of the background of the finished prints, e.g. citric acid, tartaric acid, boric acid, naphthalene sulphonic acids, thiourea, allyl thiourea and/or urea. It can further be advantageous for non-monomeric substances to be added to the solutions used for the preparation of the light sensitive coating by which the penetration of diazo compound into the support is checked or even completely prevented, e.g. natural or synthetic resins.

Examples of diazo compounds according to the present invention are described below by their formulas:

*Formula 1*

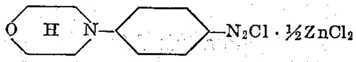

*Formula 2*

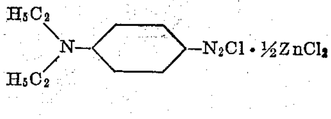

*Formula 3*

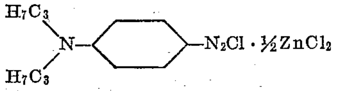

*Formula 4*

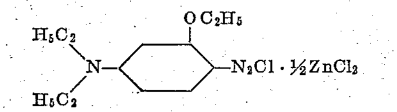

*Formula 5*

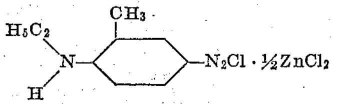

*Formula 6*

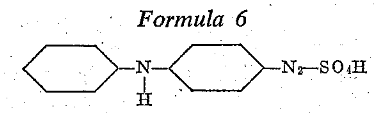

*Formula 7*

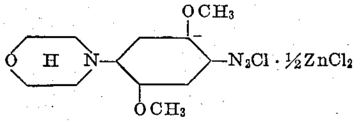

*Formula 8*

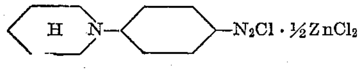

*Formula 9*

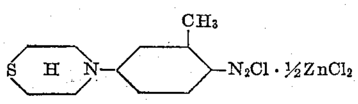

*Formula 10*

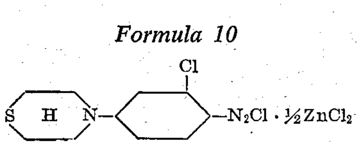

*Formula 11*

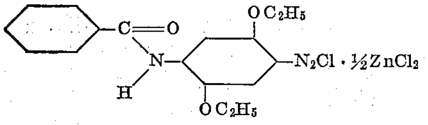

*Formula 12*

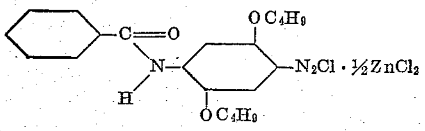

*Formula 13*

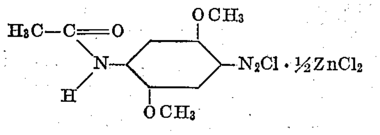

*Formula 14*

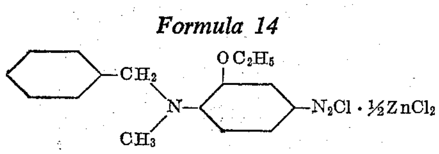

*Formula 15*

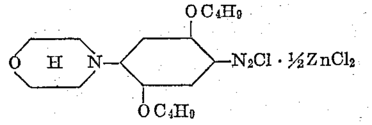

Suitable supports for the light sensitive one-component coatings include all materials which do not undergo change at the temperatures of at least 100° C. that have to be maintained for the heat treatment. The following are examples: opaque or transparent paper and foils or films of natural or synthetic substances, metal foils or plates, glass, ceramics, and textile fabrics. The coating process is effected with solutions of the diazo compounds in water or organic solvents. Copies produced in accordance with the invention on textile fabrics have frequently proved to be fast to washing.

The process according to the present invention for the preparation of duplicates introduces an important technical advance in diazotype practice with respect to the processes hitherto known. It provides a dry process in which the ammonia gas necessary in the dry development process as hitherto known is dispensed with. The finished copy is therefore free of odor. A copying apparatus built for the process of the present invention can be set up in any room without there being any troublesome odor. As only the diazo compound is applied to the support, there is no possibility of premature dyestuff formation during the storage of the light sensitive one-component material. Contrary to what happens in the case of the moist developing process hitherto usual for one-component material, dry copies are obtained straightaway by the process provided by the invention. The use of a developer with very limited shelf-life is not required by the process according to the invention.

The invention will be further illustrated by reference to the following specific examples:

(1) 2.5 g. of zinc chloride double salt of 4-morpholino-benzene-1-diazonium chloride (Formula 1), 0.5 g. of citric acid, and 7.5 g. of thiourea are dissolved in 25 cc. of water. This solution is coated upon a normal photoprinting base paper and dried. The dried paper is then exposed behind a master to light and then briefly heated to 130° C. In this way a positive copy of the master in dark violet to black is obtained.

Similar results are obtained if a plastic foil of the polyester type, e.g. a polyethylene glycol terephthalic acid ester foil, or a textile fabric, e.g. linen, is used as the support for the light senstive layer.

(2) 2.5 g. of zinc chloride double salt of 4-diethylamino-benzene-1-diazonium chloride (Formula 2) and 7.5 g. of thiourea are dissolved in 25 cc. of water. The further procedure is as described in Example 1 and a light brown positive copy of the master is obtained.

If the zinc chloride double salt of 4-diethylamino-benzene-1-diazonium chloride is replaced by that of 4-dipropyl-amino-benzene-1-diazonium chloride corresponding to Formula 3, light brown copies are likewise obtained. If an aqueous solution of 2.5 g. of zinc chloride double salt of 4-diethylamino-2-ethoxy-benzene-1-diazonium chloride (Formula 4) and 7.5 g. of thiourea in 25 cc. of water is used for the paper coating and the further procedure is as described in Example 1, a dark green copy of the master is obtained. With the zinc chloride double salt of 4-ethyl - amino - 3 - methyl - benzene-1-diazonium chloride (Formula 5) used in analogous manner, lime green copies are obtained and with diphenylamine-4-diazonium hydrogen sulphate (Formula 6) brown copies.

(3) 2.5 g. of zinc chloride double salt of 4-morpholino-2,5 - dimethoxy - benzene-1-diazonium chloride (Formula 7), 7.5 g. of thiourea, 2.5 g. of urea, and 0.5 g. of citric acid are dissolved in 25 cc. of water. Paper is coated with the solution as described in Example 1. It is then dried, illuminated via a master, and then exposed to a temperature of 130° C. A violet copy of the master is obtained.

(4) If 2.5 g. of zinc chloride double salt of 4-piperidino-benzene-1-diazonium chloride (Formula 8) and 7.5 g. of thiourea are dissolved in 25 cc. water and the procedure described in Example 1 is followed, an orange-to-brown copy is obtained.

(5) 2.5 g. of zinc chloride double salt of 4-benzoylamino-2,5-diethoxy - benzene-1-diazonium chloride (Formula 11) and 7.5 g. of thiourea are dissolved in 25 cc. of water. As described in Example 1, the solution is coated upon paper which is then dried, illuminated via a master, and then exposed to a temperature of 120° C. A light brown image of the master is obtained.

If the zinc chloride double salt of 4-benzoyl-amino-2,5-dibutoxy-benzene-1-diazonium chloride (Formula 12) is used for the preparation of the coating solution for the paper, light brown copies are obtained, or with the zinc chloride double salt of 4-acetylamino-2,5-dimethoxy-benzene-1-diazonium chloride (Formula 13), blue black copies.

(6) If paper is coated with a solution of 2.5 g. of zinc chloride double salt of 4-N-benzyl-N-methyl-amino-3-ethoxy-benzene-1-diazonium chloride (Formula 14) and 7.5 g. of thiourea in 25 cc. of water and dried and the light sensitive one-component paper thus obtained is then illuminated behind a master in the manner described in Example 1 and treated with heat of a temperature of 125° C., a yellow brown copy of the master is obtained.

(7) A solution of 1.5 g. of zinc chloride double salt of 4-morpholino-2,5-dibutoxy-benzene-1-diazonium chloride (Formula 15) in 25 cc. of methanol and a solution of 1.5 g. of citric acid and 3.75 g. of polyvinyl butyral, e.g. 3.75 g. of the product commercially available under the registered trademark Mowital B 60 SL in 75 cc. of methanol are mixed together. If the mixture is applied to paper and dried, light sensitive paper is obtained which is illuminated via a master and treated with heat of 130° C. in the manner described in Example 1. A blue violet copy of the master is obtained.

(8) 2.5 g. of the zinc chloride double salt of 4-diethyl-amino-2-ethoxy-benzene-1-diazonium chloride, 7.5 g. of thiourea, and 0.75 g. of polyvinyl alcohol are dissolved in 25 cc. of water. An aluminum or plastic foil or a glass plate is coated in known manner with this solution and dried. After exposure under a positive master, the layer is briefly heated to 130° C. In this way, a positive image of the master used is obtained in brown-violet color shades.

It will be apparent that various changes and variations may be made within the spirit and scope of the present invention as defined by the valid interpretation of the claims.

What is claimed is:

1. A process for making a copy of a single-component diazo-type material comprising a support and a photosensitive material consisting essentially of a photosensitive thermosensitive diazonium compound of a para-phenylene diamine as the sole essential image forming material disposed on said support, said diamine having the general formula:

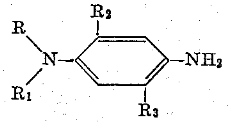

where R and $R_1$ are members of a group selected from the groups consisting of:

Group A wherein R is a member selected from the group consisting of alkyl, aralkyl, acyl, and aryl radicals, and $R_1$ is a member selected from the group consisting of hydrogen, alkyl, aralkyl, and aryl; and Group B wherein R and $R_1$ are members of the same hererocyclic ring, and where $R_2$ and $R_3$ are members selected from the group consisting of hydrogen, halogen, alkyl, and alkoxy, said process comprising the steps of:

exposing said material imagewise to decompose and bleach out said compound where light struck; and heating said material to at least 100° C. to form a light-stable, visible, colored dyestuff in the unexposed areas.

2. A process in accordance with claim 1 in which said diazonium compound is 4 - morpholino-benzene - 1 - diazonium chloride and the heating temperature is 130° C. for a brief period.

3. A process in accordance with claim 1 in which said diazonium compound is 4-morpholino-2,5-dimethoxy-benzene-1-diazonium chloride and the heating temperature is 130° C. for a brief period.

4. A process in accordance with claim 1 in which said diazonium compound is 4-morpholino-2,5-dibutoxy-benzene-1-diazonium chloride and the heating temperature is 130° C. for a brief period.

5. The process according to claim 1 wherein the diazotype material is coated on said support with a solution comprising 1 to 8% of said diazonium compound.

References Cited in the file of this patent

UNITED STATES PATENTS

| | | |
|---|---|---|
| 2,034,508 | De Boer et al. | Mar. 15, 1936 |
| 2,067,690 | Alink et al. | Jan. 12, 1937 |
| 2,095,408 | De Boer et al. | Oct. 12, 1937 |
| 2,313,288 | Barde | Mar. 9, 1943 |
| 2,405,523 | Sease et al. | Aug. 6, 1946 |
| 2,657,141 | Kessels | Oct. 27, 1953 |
| 2,665,985 | Sus | Jan. 12, 1954 |
| 2,732,299 | Morrison | Jan. 24, 1956 |
| 2,996,381 | Oster et al. | Aug. 15, 1961 |
| 3,032,414 | James et al. | May 1, 1962 |

FOREIGN PATENTS

| | | |
|---|---|---|
| 1,220,984 | France | Jan. 11, 1960 |
| 1,249,913 | France | Nov. 28, 1960 |

OTHER REFERENCES

Kosar: Photographic Science and Engineering, vol. 5, No. 4, July-August 1961, pages 242–243.

UNITED STATES PATENT OFFICE
CERTIFICATE OF CORRECTION

Patent No. 3,164,469 January 5, 1965

Hans Behmenburg et al.

It is hereby certified that error appears in the above numbered patent requiring correction and that the said Letters Patent should read as corrected below.

Column 5, line 55, for "copy of" read -- copy on --; column 6, line 15, for "hererocyclic" read -- heterocyclic --.

Signed and sealed this 1st day of June 1965.

(SEAL)
Attest:

ERNEST W. SWIDER
Attesting Officer

EDWARD J. BRENNER
Commissioner of Patents